Sept. 15, 1970        K. B. RAY        3,528,549
APPARATUS FOR THE TREATMENT OF WASTE WATER
Filed June 5, 1968        2 Sheets-Sheet 2
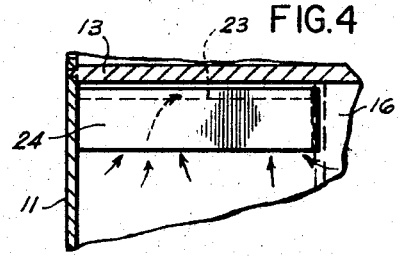
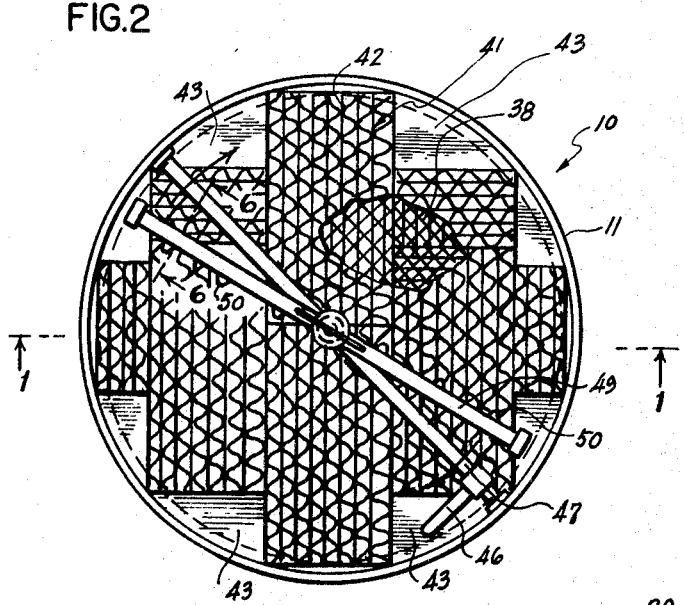
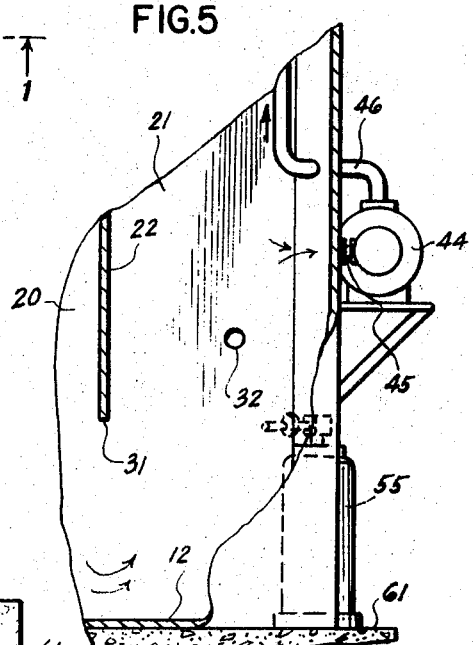
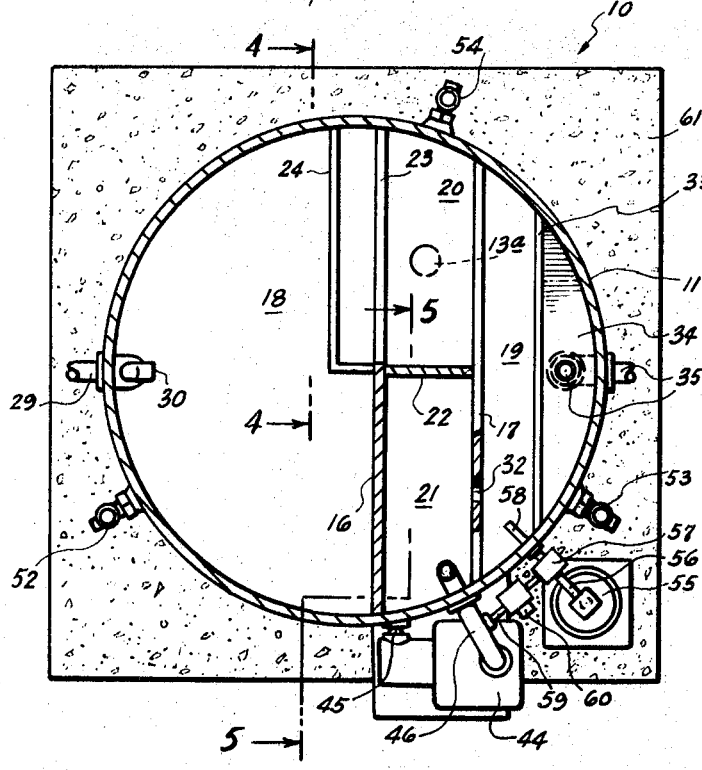
INVENTOR
KENNETH B. RAY

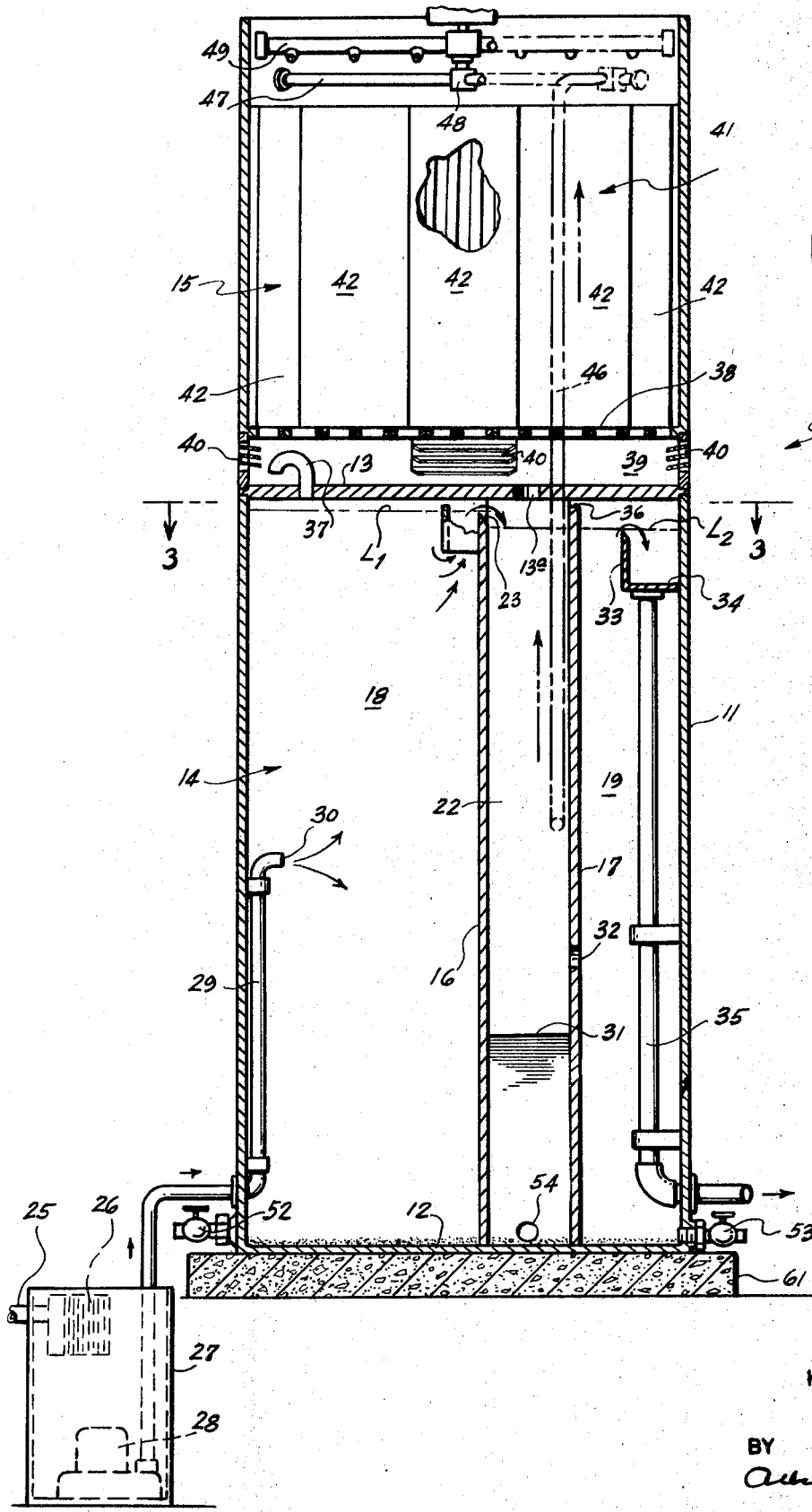

United States Patent Office 3,528,549
Patented Sept. 15, 1970

3,528,549
APPARATUS FOR THE TREATMENT OF WASTE WATER
Kenneth B. Ray, Greenwich, Conn., assignor to Waste Water Treatment Corp., New York, N.Y., a corporation of New York
Filed June 5, 1968, Ser. No. 734,712
Int. Cl. B01d 23/20
U.S. Cl. 210—151                    11 Claims

ABSTRACT OF THE DISCLOSURE

In an apparatus for the treatment of waste water, a vertically elongated tower structure has a lower section for settling solids from the waste water and a superimposed upper section for biochemical treatment of the water, the lower section is divided by vertical partitions into a series of chambers for holding bodies of water extending nearly to the top of that lower section, the waste water to be treated is introduced into the first of the chambers and the treated water is discharged from near the top of the last of the chambers, the upper section contains a trickling filter medium, water is withdrawn from an intermediate chamber of the series and distributed over the top of the filter medium for gravity flow downwardly on the latter, air is admitted to the lower end of the upper section for passage upwardly therethrough in contact with the flow of water on the filter medium, and the water flowing off the filter medium is collected and delivered into an intermediate chamber of the series.

---

This invention relates generally to the treatment of industrial waste water, such as, the effluents from laundries, food processing plants, textile mills, paper mills, dyestuff plants and the like, and is particularly directed to improvements in apparatus for the removal from such waste water of organic impurities, such as, detergents and soaps, so that the treated water may be safely discharged into streams, rivers, lakes or other bodies of water without polluting the same or may be reused, as for car washing, air conditioning or other industrial purposes.

Apparatus heretofore provided for the treatment of industrial waste water has usually comprised several separately manufactured components and relatively large numbers of connecting parts that are assembled together at the site when the apparatus is to be installed, whereby the costs and time for installation are undesirably high and the apparatus is not easily removable from one site for erection and operation at a new site. In existing apparatus employing aerobic digestion of organic substances in the waste water, air under pressure, as from a blower, is usually required for bubbling through the water or for other contact therewith, as in a trickling filter. Further, the existing apparatus for waste water treatment usually requires chemical additions to the water so that such chemicals and the supervision required to ensure the timely replenishment thereof contribute to undesirably high operating costs.

Accordingly, it is an object of this invention to provide apparatus for the treatment of industrial waste water which may be substantially factory assembled and shipped in that condition so as to minimize the time and costs of installation and further to facilitate the removal of the apparatus to another location, if and when desired.

Another object is to provide apparatus of the described character that is relatively simple in construction and operation and yet fully satisfies the requirements established by federal, state and municipal authorities for the removal of pollutants from industrial waste water prior to the discharge thereof into streams, rivers, lakes or the like.

Still another object is to provide apparatus of the described character in which industrial waste water is treated by the combination of settling or sedimentation and aerobic digestion or biochemical treatment so as to discharge the treated water in a condition suitable for industrial reuse or for discharge into streams, rivers, lakes or the like, and wherein such combined treatments are effected in sections of a unitary tower structure which are arranged for most efficient realization of the respective treatments.

A further object is to provide an apparatus of the described type having a minimum number of movable and powered parts so as to minimize the maintenance and servicing that may be required for ensuring reliable operation of the apparatus.

A still further object is to provide an apparatus of the described type in which all parts likely to require maintenance, servicing or inspection are readily accessible and easily replaced when necessary.

In an apparatus according to this invention for achieving the above objects, an elongated tower structure, such as a metal cylinder, which is directed vertically in its position of use, but adapted to be arranged horizontally on a truck, boat or railroad flat car for convenient transport from a factory where assembly of the apparatus is substantially completed or for transport from one operating site to another, has a lower section for settling solids from the waste water and a superimposed upper section for biochemical treatment of the water, the lower section is divided by vertical partitions into a series of chambers for holding bodies of water extending nearly to the top of the lower section, the waste water to be treated is introduced into the first chamber of the series and treated water is discharged from near the top of the last chamber of the series, preferably in response to the introduction of waste water into the first chamber, a trickling filter medium is contained in the upper section of the tower structure, water is withdrawn, as by a pump, from an intermediate chamber of the series in the lower section, preferably at a mean rate exceeding that at which waste water is introduced into the first chamber, and is distributed over the top of and for gravity flow downwardly on the filter medium in the upper section, the tower structure has air introduced into the lower end of its upper section for passage upwardly therethrough, preferably by a chimney effect, in contact with the flow of water on the filter medium, and the water flowing off the filter medium is collected and delivered into an intermediate chamber of the series.

In apparatus according to this invention, two intermediate chambers are preferably provided in the series of chambers defined in the lower tower section, with one of such intermediate chambers receiving water from the top of the first or primary settling chamber and also receiving the water collected from the trickling filter medium, and with the other of the intermediate chambers being the source of the water withdrawn for gravity flow downwardly on the filter medium. Further, the two intermediate chambers preferably communicate with each other at their lower regions and said other intermediate chamber communicates with the last or final settling chamber substantially below the top of the latter.

The foregoing arrangement of the apparatus according to this invention makes it possible, in a unitary, easily transported tower structure in which all treatments are to be effected, to provide the settling chambers with sufficiently large vertical dimensions for efficient sedimentation therein and to avoid agitation of the liquid in the final settling chamber for facilitating the removal from the treated water of those phosphates carried by the aerated water upon its return from the overhead trickling filter to the recirculating or intermediate chambers. Further, with the described arrangement, the transfer of water from the primary settling chamber, through the intermediate chambers and to the final settling chamber, and the discharge of treated water from the final settling chamber can be conveniently made to occur in response to, and at the rate of the admission of waste water to the primary settling chamber without resort to valves, pumps, connecting pipes or other complicating hardware.

It is another feature of the invention to effect the distribution or showering of the water onto the trickling filter medium by means of a distributor rotatably mounted above such medium and having nozzles from which the water delivered under pressure to the distributor from an intermediate chamber, as by a pump, is made to issue in jets directed to effect rotation of the distributor. Thus, uniform distribution of the water showered onto the filter medium for trickling through the latter is effected without a motor to drive the distributor. In fact, the only motor required to operate the apparatus according to this invention is that driving the pump by which liquid is withdrawn from an intermediate chamber for showering onto the filter medium. In installations of the apparatus, there may also be provided a sump to receive the waste water to be treated and a sump pump to feed the waste water from the sump to the primary settling chamber. Therefore, an installation of the apparatus for waste water treatment requires a maximum of two pumps and associated motors and controls therefor which may be mounted on the tower structure, from which it is apparent that the electrical and piping connections required for such installation are minimal and may be quickly and inexpensively effected.

The above, and other objects, features and advantages of the invention, will be apparent in the following detailed description of an illustrative embodiment which is to be read in connection with the accompanying drawings, wherein:

FIG. 1 is a vertical sectional view of an apparatus according to this invention, as viewed along the line 1—1 on FIG. 2;

FIG. 2 is a top plan view of the apparatus of FIG. 1;

FIG. 3 is a horizontal sectional view taken along the line 3—3 on FIG. 1;

FIG. 4 is a detail sectional view taken along the line 4—4 on FIG. 3;

FIG. 5 is another detail view, partly in elevation and partly in section as viewed along the line 5—5 on FIG. 3;

FIG. 6 is an enlarged, detail sectional view taken along the line 6—6 on FIG. 2; and FIG. 7 is a schematic view of an electrical control system for automatic operation of the apparatus.

Referring to the drawings in detail and initially to FIGS. 1, 2 and 3 thereof, it will be seen that the apparatus 10 for the treatment of waste water according to this invention, as there shown, comprises a cylindrical tower structure 11 which is directed vertically in its position of use, and which is closed at its lower end, as by an end wall 12. A horizontal wall 13 extends across the interior of tower 11 intermediate the ends of the latter to divide the same into a lower section 14 and an upper section 15.

The lower section 14 is further divided by spaced, parallel vertical partitions 16 and 17 extending chordally thereacross to define a series of chambers that include a first or primary settling chamber 18, a last or final settling chamber 19, and intermediate or recirculating chambers 20 and 21 which are located between partitions 16 and 17 and delineated from each other by a vertical intermediate partition or baffle wall 22. The part of partition 16 between chambers 18 and 21 extends from end wall 12 up to wall 13, and the remainder of partition 16, that is, the part between chamber 20 and chamber 18, has its upper edge 23 (FIG. 1) spaced downwardly from wall 13, and preferably obliquely cut, as shown, to define a weir over which water can be decanted from the top of settling chamber 18 into intermediate or recirculating chamber 20. The edge or weir 23 at the top of partition 16 defines the minimum level $L_1$ at which water is maintained in settling chamber 18 during operation of apparatus 10. A baffle 24 extends along weir 23 within chamber 18 and has its lower edge below level $L_1$ and its upper edge extending above that level so that water reaching weir 23 must pass below baffle 24 which thus acts to trap scum on the surface of the body of water in chamber 18 and to prevent the discharge of such scum into recirculating chamber 20.

The waste water to be treated, for example, the waste water from a laundry which contains detergents, soaps and other pollutants, is received through a pipe 25 and passes through a set of removable screens 26 of aluminum or stainless steel having a mesh selected to remove relatively large solid particles, such as lint and the like. The waste water passing through screens 26 is received in a sump 27 of suitable size and shape. A sump pump 28 is provided in sump 27 and is suitably actuated, as hereinafter described, to pump waste water from the sump through a pipe 29 which discharges at 30 into primary settling chamber 18 at a location intermediate the top and bottom of such chamber.

Partition 22 dividing intermediate or recirculating chambers 20 and 21 is formed to permit communication therebetween, preferably at the lower regions of such chambers remote from the location at which liquid is decanted over weir edge 23 from chamber 18 into chamber 20. As shown particularly on FIGS. 1 and 5, the desired communication between chambers 20 and 21 may be provided by spacing the lower edge 31 of partition 22 above bottom end wall 12 so that liquid can flow through the resulting gap or space from chamber 20 to chamber 21. Further, communication is established between intermediate chamber 21 and final settling chamber 19, preferably at a location above the level of edge 31 but substantially below the top of chamber 19 from which the treated water is to be withdrawn or discharged. As shown, such communication may be provided by an opening 32 or openings in partition 17 at the portion of the latter which defines chamber 21.

The withdrawal of treated water from chamber 19 is effected by flow over a weir 33 constituted by a side wall of a trough 34 disposed at the top of chamber 19 and from which the treated water is drawn off through a pipe 35 (FIGS. 1 and 3). As shown, the level of weir 33 is slightly lower than that of weir 23 to establish a level $L_2$ of liquid in chambers 19, 20 and 21 that is similarly slightly lower than the liquid level $L_1$ in chamber 18. Although partition 17 extends above liquid level $L_2$ so that liquid from chamber 20 can reach chamber 19 only by way of chamber 21, that is, under edge 31 of partition 22 and then through opening 32, the top edge of partition 17 may terminate a short distance below wall 13, as at 36 (FIG. 1), so that the air spaces above liquid level $L_2$ in chambers 19, 20 and 21 are in communication with each other and with the air space above liquid level $L_1$ in chamber 18 which is, in turn, vented to the atmosphere, as through a vent pipe 37 extending through wall 13.

The upper section 15 of tower 11 has a foraminous false bottom wall 38, for example, in the form of a grating or an expanded metal, spaced upwardly from wall 13 to provide a space 39 therebetween to which air is admitted from the atmosphere, as through louvres 40. Packed within upper section 15 and supported on wall 38 is a trickling filter medium 41 defining large surface areas over which liquid can trickle downwardly for efficient aeration by air passing countercurrently, that is, upwardly, through the filter medium. Although any porous trickling filter medium may be employed, a particularly suitable trickling filter medium has been found to be constituted by a honeycomb-like structure formed of alternating flat and corrugated sheets of plastic, such as, polyvinylchloride, which are electronically bonded together or otherwise joined to form blocks 42 having passages or channels extending vertically therethrough. A plastic filter medium, as described, is preferred for its large surface area, lightness and relatively high structural strength. Trickling filter medium of the described type is available commercially, for example, from B. F. Goodrich Industrial Products Co., of Marietta, Ohio, under the name Koroseal Vinyl Core. The blocks 42 are arranged in one or more layers in upper section 15 so as to occupy substantially the entire cross-section of tower 11. When tower 11 is cylindrical and the filter media is in the form of rectangular blocks 42, as shown, the spaces or gaps that necessarily remain between the inner surface of tower 11 and the adjacent blocks 42 are blocked, at the top and bottom of the filter medium, as by imperforate sheets 43 (FIG. 2) of plastic or other suitable material, to prevent by-passing of the filter medium 41 by the water and air to be passed countercurrently therethrough.

As is shown particularly on FIGS. 1 and 2, the upper end of tower 11 is open and substantially unobstructed so that air introduced at louvers 40 will be induced, by a chimney effect, to flow upwardly through filter medium 41 for discharge at such open end of the tower.

In accordance with this invention, the water to be trickled downwardly on filter medium 41 for aeration by the upward air flow therethrough is withdrawn from intermediate chamber 21, preferably at a mean or average rate exceeding that at which waste water to be treated is supplied to primary settling chamber 18. Such withdrawal of water from chamber 21 is shown to be effected by a pump 44 mounted on the outside of tower 11 (FIGS. 3 and 5) and having its inlet 45 connected to chamber 21, preferably at an elevation intermediate the top and bottom thereof. The outlet of pump 44 is connected to a pipe 46 which runs upwardly within tower 11 and, at the top of the latter, is connected to a support pipe 47 extending diametrically above filter medium 41 (FIGS. 1 and 2). Pipe 47 carries a centrally located bearing 48 which is preferably of a water lubricated plastic for easy maintenance, and in which a distributor pipe 49 is mounted, at its center, for rotation in a horizontal plane while receiving the pumped water from pipe 47. Distributor pipe 49 is provided with nozzles 50 spaced apart therealong at opposite sides of the axis of rotation and from which the water under pressure issues in the form of jets. As is shown particularly on FIG. 6, the nozzles 50 are inclined downwardly at an acute angle to the horizontal plane of rotation 51 of the distributor pipe, with the nozzles on one half of pipe 49 being directed toward one side of the latter and those on the other half of pipe 49 being directed toward the opposite side, so that the jets of water issuing from nozzles 50 will propel distributor pipe 49 to rotate and will shower the issuing water uniformly over the top of trickling filter medium 41.

The water flowing off trickling filter medium 41 is collected on horizontal wall 13 and returned to intermediate chamber 20 through an opening 13a or openings provided in wall 13 above chamber 20.

In order to permit the removal of settled solids from lower section 14 of apparatus 10 after operation of the latter for a substantial period of time, valved outlets 52, 53 and 54 extend from the bottom of chambers 18, 19 and 20. All of chambers 18, 19, 20 and 21 can be drained through such valved outlets and the latter then connected to a suitable suction device for removing the settled solids.

When it is desired to effect chlorination or other chemical treatment of the water prior to discharge from apparatus 10, the chlorine or other chemical treating substance is added to the water in final settling chamber 19, preferably at a rate that is proportional to the rate of admission of water to be treated and also to the rate of discharge of treated water from apparatus 10. In the illustrated embodiment, the chlorine to be added is contained, in liquid form, in a tank 55 (FIGS. 3 and 5) mounted alongside housing 11, and the outlet 56 of such tank is connected through an injector device 57 to a discharge pipe 58 opening into chamber 19. Also connected to injector device 57 is a tap 59 extending from pipe 46 and having a solenoid controlled valve 60 interposed therein. Whenever valve 60 is opened in response to energization of its solenoid to permit water under pressure to flow from pipe 46 through tap 59 to injector device 57, such water passes through the injector device to discharge pipe 58 and, in doing so, causes injector device 57 to release chlorine gas from tank outlet 56 for dilution in the water introduced into chamber 19 through pipe 58. The injector device 57 may be of a commercially available type, such as that obtainable from Wallace and Teirman, of Belleville, N.J., under the designation "V–50 Chlorinator," and in which the proportion of chlorine gas addition to the water flow in tap 59 can be adjustably controlled.

In the embodiment shown, solenoid valve 60 is energized whenever sump pump 28 is operated to pump water to be treated from sump 27 into primary settling chamber 18. As indicated schematically on FIG. 7, the motor $M_1$ for driving sump pump 28 may be connected to power supply lines $l_1$ and $l_2$ through normally open contacts $C_1$ of a relay R having its coil connected in series with a pressure responsive switch $SW_1$ which closes whenever the water in sump 27 reaches a predetermined maximum level and which remains closed until the water in the sump recedes to a predetermined minimum level. Further, normally open contacts $C_2$ of relay R are connected in series with solenoid valve 60 so that the latter is energized simultaneously with the operation of pump 28. The recirculating pump 44 may have its motor $M_2$ connected to power supply lines $l_1$ and $l_2$ through a manually operable switch $SW_2$ so that, upon closing of such switch, pump 44 will be operated continuously.

Prior to commencement of normal automatic operation of apparatus 10, primary settling chamber 18 is filled with waste water up to the level $L_1$ and, by overflow from chamber 18, chambers 19, 20 and 21 are filled with waste water up to the level $L_2$. If it is desired to avoid the initial discharge of any untreated waste water, finally settling chamber 19 may be filled with pure water, as through discharge pipe 35, simultaneously with the filling of intermediate chambers 20 and 21 by overflow from chamber 18. Then pump 44 is continuously operated to withdraw water from chamber 21 and to shower such water through distributor 49 over the top of filter medium 41 for gravity flow downwardly on the latter in contact with the air flowing upwardly through the void spaces of medium 41 from louvres 40 to the open top of tower structure 11. The trickling filter medium 41 provides large aerated surface areas on which bacteria and other micro-organisms can grow to achieve the biochemical treatment of the waste water by which organic compounds contained in the waste water are converted into $CO_2$, $H_2O$ and other harmless end products such as humus or slime. The water flowing off filter medium 41 is collected on wall 13 at the bottom of upper section 15 and returned through opening 13a to intermediate chamber 20 of lower section 14. The recirculation of water from chamber 21 through filter medium 41 to chamber 20 and thence back to chamber 21 is continued until the micro-organisms grown on the filter medium have subjected all of the water in chambers 20 and 21 to biochemical treatment or aerobic digestion sufficiently to reduce the biological oxygen demand (B.O.D.) thereof to the desired extent. Since the biochemical treatment of the water flowing downwardly on filter medium 41 generates some heat and since industrial waste waters are generally warm, there is a natural updraft through the filter medium for promoting the chimney effect by which the upward flow of air is induced to supply oxygen necessary for the biochemical treatment. After there has been achieved an adequate growth of micro-organisms on filter medium 41 and an adequate reduction of the B.O.D. of the water in chambers 20 and 21, apparatus 10 is in condition to commence its normal automatic operation.

For such normal operation, waste water from a laundry or other source is delivered through pipe 25 and filtering screens 26 into sump 27, and discharge pipe 35 is connected to piping (not shown) leading to the point of final discharge, such as, a sewer, stream, river, lake or the like, or the point of utilization of the treated water. When the waste water in sump 27 reaches to the maximum level for which switch $SW_1$ is set, pump 28 is operated to pump waste water through pipe 29 into primary settling chamber 18 until the water in sump 27 has receded to the minimum level for which switch $SW_1$ is set to open. Thus, a fixed volume of waste water is introduced into chamber 18 during each operation of sump pump 28. Since chamber 18 is filled to level $L_1$ at the initiation of normal operation, the introduction of a fixed volume of waste water from sump 27 into chamber 18 causes an equivalent volume of water to overflow weir 23 into the top of intermediate chamber 20. Within chamber 18, which is of large vertical extent, substantial sedimentation of solid particles from the waste water occurs so that the water overflowing weir 23 is at least partially clarified. The introduction of a volume of water from chamber 18 into chamber 20 causes the transfer of the same volume of water from the bottom portion of chamber 20 under edge 31 of partition 22 into the bottom portion of chamber 21 and from the latter through opening 32 into final settling chamber 19. Such addition of water from chamber 21 into chamber 19 causes an equivalent volume of water to overflow weir 33 into trough 34 for discharge through pipe 35.

Although sump pump 28 may operate intermittently to deliver fixed volumes of waste water to chamber 18 as sump 27 is periodically filled, recirculating pump 44 is operated continuously and has a suitable pumping capacity to ensure that the rate of recirculation of water from chamber 21 through trickling filter medium 41 and back to chamber 20 exceeds the mean rate of delivery of waste water to chamber 18. Thus, all of the water that eventually reaches final settling chamber 19 is made to pass one or more times through trickling filter medium 41 for exposure to the biochemical treatment therein. Of course, the larger the rate of recirculation of water by pump 44 as compared with the mean rate of introduction of waste water to apparatus 10 the more effective will be the removal of organic materials by the biochemical treatment, but it has been found that, in all cases a reduction of the biological oxygen demand (B.O.D.) of at least 90% and the reduction of detergents of the A.B.S. or L.A.S. type to levels which comply with all federal, state and municipal standards may be easily obtained.

As explained above, during each operation of sump pump 28 to deliver waste water to chamber 18 and to cause the discharge of an equivalent volume of treated water from the top of chamber 19, solenoid valve 60 is energized to permit water under pressure to flow through tap 59 and to cause injector device 57 to dilute chlorine gas from tank 55 in such water flow for addition to the body of water in chamber 19. Thus, as volumes of water are passed from chamber 21 into chamber 19, proportional amounts of chlorine are automatically added thereto. Although specific mention has been made herein to the addition of chlorine to the water in final settling chamber 19, it is to be understood sodium hypochlorite or other chlorinating or oxidizing agents may be used, or chlorination may be dispensed with where not necessary. Further, the water in final settling chamber 19 may be dosed with other chemicals introduced by suitable feeding devices known in the art so as to effect a so-called tertiary treatment for removal of specific undesirable anions or cations.

It will be appreciated that the apparatus 10, as described, may be substantially completely assembled at a factory and then conveniently transported, with tower structure 11 arranged horizontally on a truck, railroad flatcar or ship, to its installation site where tower structure 11 is placed vertically on, and bolted to a previously prepared concrete pad or base 61. After such erection of tower structure 11, it only remains to connect pipes 25 and 35 to the source of waste water to be treated and to the recipient of the treated water and to make the necessary electrical connections to a source of electric power. Similarly, if at any time it is desired to remove the apparatus 10 to a new operating site, pipes 25 and 35 and the electrical connections are disconnected and the bolts holding the tower structure to pad 61 are freed to permit the convenient transport of the apparatus as an assembled unit.

A tower of convenient size may have a diameter of 8 feet and a length or vertical extent of 22 feet so as to be readily transportable, as described above, and yet have a sufficient treating capacity for most purposes. However, where the required treating capacity exceeds that of a single tower, two or more of such towers may be erected and used together so as to avoid the necessity of constructing and transporting undesirably large and cumbersome pieces of equipment. Although particular dimensions have been given above for the tower 11, it is to be understood that such dimensions may be varied over a wide range, and that the relationship of the heights of lower section 14 and upper section 15 and the relationship of the volumes of chambers 18, 19, 20 and 21 may be varied from that shown so as to provide varying degrees of sedimentation and recirculation for suiting different types of applications involving varied industrial wastes.

Although the cylindrical configuration of tower 11 is preferred as being the least expensive to construct, the tower may be of rectangular or other cross-section. The tower may be made of carbon steel for most purposes, or even of plastic, but for special applications involving highly corrosive industrial wastes it may be desirable to construct the tower of other corrosion resistant metals. In all cases the tower combines sedimentation, biochemical and chlorination or other chemical treatments of the waste water in an integrated unit which is readily manufactured by production methods and easily transported and installed.

By reason of the vertically elongated configuration of the tower structure 11, the separation of particulate matter from the water, especially in primary settling chamber 18 and final settling chamber 19, can be more readily and efficiently effected than in prior art water treatment devices. As is apparent from Stoke's law, the height of a chamber in which sedimentation is to be effected is an important factor in securing effective separation of solids from liquids. Thus, by effecting sedimentation, biochemical treatment and chlorination in a unitary structure of tower-like configuration for easy manufacture, transport and installation, the bodies of water held in chambers 18 and 19 and reaching near to the top of lower section 14 can be made sufficiently tall to secure any desired degree of solids separation.

As is well known, a pressing problem in connection with the discharge of treated sewage or industrial wastes into lakes or streams or rivers having a sluggish flow is the eutrophication of such bodies of water by excessive phosphates discharged therein and promoting the growth of vegetation. This problem is ameliorated with the apparatus 10 by reason of the interposing of partition 17 between intermediate chambers 20 and 21 and final settling chamber 19. The overflow of water from chamber 18 into intermediate chamber 20 and the return of water to the latter chamber from the overhead trickling filter causes substantial agitation of the water in chamber 20 so that little or no sedimentation occurs therein. However, since chamber 21 communicates with chamber 20 only at the lower portion thereof and since final settling chamber 19 receives water from chamber 21, the body of water held in chamber 19 is substantially quiescent and effective sedimentation can occur therein. Thus, the humus material formed as a degradation product by the biochemical treatment in the trickling filter medium 41 and which carries down considerable amounts of phosphate anions upon return of the water from the trickling filter to chamber 20 is effectively separated from the water in quiescent chamber 19 so that the treated water discharged over weir 33 is substantially reduced in phosphate content.

The provision of the recirculation chambers 20 and 21 intermediate settling chambers 18 and 19 further makes it possible to achieve adequate biochemical treatment of the water by the repeated flow thereof on trickling filter medium 41, with the air flow through the latter being merely induced by a chimney effect, that is, without resort to air blowers, fans or the like. Thus, the apparatus 10 can be made to operate with only two pumps 28 and 44 and with a distributor 49 made to rotate by the water pressure from pump 44. Such operating components, as well as the bearing 48 supporting the distributor, are all readily accessible for servicing, maintenance or replacement.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for the treatment of industrial waste water comprising a vertically elongated tower structure having therein a lower section for settling solids from the waste water and a superimposed upper section for biochemical treatment of the water, partition means in the lower section dividing the space therein into a series of vertically elongated chambers lying side by side for holding therein bodies of water, said chambers communicating laterally one with another, and the first of them being sufficiently large to hold the water therein in a state of sedimentation, means to introduce water to be treated into the first of said chambers, means near the top of the last of said chambers for discharging treated water therefrom, said upper section containing a trickling filter medium, means for drawing water from an intermediate chamber of said series and distributing such water over the top of and for gravity flow downwardly on said medium in said upper section, means in said tower structure at a location above said chambers for admitting air from the ambient atmosphere into the lower end of said upper section for passage upwardly therethrough by chimney action in contact with the flow of water on said filter medium, and means for passing the water flowing off said filter medium back into water in said lower section at a location away from said last chamber.

2. Apparatus according to claim 1, in which two intermediate chambers are provided in said series between said first and last chambers, one of said intermediate chambers receives water from near the top of said first chamber and communicates with the other of said two intermediate chambers at the lower portions thereof, and said other intermediate chamber communicates with said last chamber substantially below said top of the latter.

3. Apparatus according to claim 2, in which said partition means includes spaced apart, parallel first and second partitions extending across said lower section of the tower structure to separate said first and last chambers from said intermediate chambers therebetween, and a third partition extending between said first and second partitions to separate said one intermediate chamber from said other intermediate chamber.

4. Apparatus according to claim 3, in which, at the side of said third partition facing toward said one intermediate chamber, said first partition has an upper edge portion lower than the remainder of its upper edge to define a first weir establishing the level of water maintained in said first chamber and over which said supernatant water is discharged from near the top of said first chamber into said one intermediate chamber, said means for discharging treated water from near the top of said last chamber including second overflow weir to establish the level of liquid maintained in said last chamber and in said two intermediate chambers slightly below said level maintained in said first chamber.

5. Apparatus according to claim 4, in which said third partition has the lower edge thereof spaced substantially above the bottom of said intermediate chambers so that the communication between the latter is established under said lower edge, and said second partition has at least one opening therein above said lower edge of the third partition and at the side of the latter facing toward said other intermediate chamber to establish said communication between the latter and said last chamber.

6. Apparatus according to claim 2, in which said means for passing back into said lower section the water flowing off said filter medium includes partition means extending laterally in said tower structure beneath said filter medium for excluding said water from said last chamber and directing such water into at least said one intermediate chamber.

7. Apparatus according to claim 1, in which said tower structure comprising an upright tubular wall encasing said sections and open at its top end, supporting means mounted within said upper section to support said filter medium in spaced relation to said partition means, and said means for admitting air into said upper section including passageways in said tower structure leading from the ambient atmosphere into the space beneath said filter medium so that air will be drawn into said space and passed upwardly in contact with the water on said medium by a chimney effect.

8. Apparatus according to claim 1, in which said means for drawing water from an intermediate chamber of said series includes pump means operated to draw water from said intermediate chamber at a mean rate exceeding that at which waste water to be treated is introduced into said first chamber.

9. Apparatus according to claim 1, in which said means for drawing water from an intermediate chamber and distributing the water over the top of said filter medium includes pump means having its inlet connected with said intermediate chamber, distributor means mounted for rotation in a horizontal plane above said filter medium and connected with the outlet of said pump means to receive water under pressure therefrom, and spray nozzle means opening from said distributor means and arranged to issue jets of said water under pressure in directions inclined downwardly at acute angles to said horizontal plane whereby said jets propel the distributor in rotation and shower the liquid uniformly onto the top of said filter medium.

10. Apparatus according to claim 1, further comprising means operative to introduce a water treating chemical into said last chamber.

11. Apparatus according to claim 1, further including means rendered operative upon the introduction of waste water to be treated into said first chamber for introducing a water treating chemical into said last chamber.

References Cited

UNITED STATES PATENTS

| | | | |
|---|---|---|---|
| 2,447,511 | 8/1948 | Leaf | 210—151 X |
| 2,553,228 | 5/1951 | Yonner | 210—151 |

JOHN W. ADEE, Primary Examiner

U.S. Cl. X.R.

210—202, 261